(12) United States Patent
Martin

(10) Patent No.: US 7,465,411 B2
(45) Date of Patent: Dec. 16, 2008

(54) CATALYST-MEDIATED IN-SITU GENERATION OF DIOXIRANE

(75) Inventor: Roy W. Martin, Downers Grove, IL (US)

(73) Assignee: Truox, Inc., McClelland, CA (US)

(*) Notice: Subject to any disclaimer, the term of this patent is extended or adjusted under 35 U.S.C. 154(b) by 216 days.

(21) Appl. No.: 11/378,889

(22) Filed: Mar. 16, 2006

(65) Prior Publication Data

US 2007/0219108 A1    Sep. 20, 2007

(51) Int. Cl.
| | |
|---|---|
| C01B 15/08 | (2006.01) |
| C11D 3/39 | (2006.01) |
| C11D 3/395 | (2006.01) |
| A62D 3/38 | (2007.01) |
| A61L 101/14 | (2006.01) |
| A61L 101/44 | (2006.01) |
| D06L 3/00 | (2006.01) |

(52) U.S. Cl. ............................ 252/186.38; 252/186.39; 252/186.21; 252/186.25; 252/183.11; 252/183.12; 252/183.13; 252/183.14; 8/101; 8/111; 510/191; 510/276; 510/238; 422/29; 210/762; 210/763

(58) Field of Classification Search ............ 252/183.12, 252/183.13

See application file for complete search history.

(56) References Cited

U.S. PATENT DOCUMENTS

| | | | | |
|---|---|---|---|---|
| 5,360,568 A | * | 11/1994 | Madison et al. | 510/371 |
| 5,360,569 A | * | 11/1994 | Madison et al. | 510/371 |
| 5,370,826 A | * | 12/1994 | Madison et al. | 510/116 |
| 5,525,121 A | * | 6/1996 | Heffner et al. | 8/111 |
| 5,576,282 A | * | 11/1996 | Miracle et al. | 510/276 |
| 5,755,993 A | * | 5/1998 | Heffner et al. | 252/186.39 |
| 6,455,751 B1 | * | 9/2002 | Hoffman et al. | 588/320 |
| 6,863,830 B1 | * | 3/2005 | Purdy et al. | 210/756 |
| 2002/0004473 A1 | * | 1/2002 | Busch et al. | 510/302 |
| 2003/0045747 A1 | * | 3/2003 | Wurziger et al. | 562/418 |
| 2005/0035066 A1 | * | 2/2005 | Martin et al. | 210/753 |
| 2006/0013750 A1 | * | 1/2006 | Martin et al. | 422/241 |
| 2006/0078584 A1 | * | 4/2006 | Lightcap et al. | 424/405 |

* cited by examiner

Primary Examiner—Joseph D Anthony

(57) ABSTRACT

A composition capable of expedited in-situ generation of dioxirane and a method of preparing the composition are presented. The composition includes a transition metal catalyst, peracid donor, and carbonyl donor, and forms an effective multi-purpose oxidizing (e.g., bleaching) solution. Methods of using the bleaching solutions and their application are also presented. The composition provides a cost-effective means of producing a dioxirane-based multi-purpose bleaching solution for use on laundries, carpets, hard surfaces, bathroom surfaces, floors and the like.

36 Claims, No Drawings

CATALYST-MEDIATED IN-SITU GENERATION OF DIOXIRANE

FIELD OF INVENTION

This invention relates to production of dioxirane and in particular to in-situ generation of dioxirane.

BACKGROUND

Since its discovery, dioxirane has found many uses including epoxification reactions, disinfection, decontamination, laundry bleaching, and the like. It has also been reported that carbonyl chemistry from both ketone and aldehyde donors are suitable for the generation of dioxiranes. Dioxiranes can be produced through decomposition of potassium monopersulfate. Accelerated decomposition of potassium monopersulfate ion ($KHSO_5^-$) was reported by Montgomery, R. E. *J. Am. Chem. Soc.* 1974, 96, 7820. Montgomery observed and reported that ketone (acetone) can catalyze the decomposition of Oxone® (a triple salt of potassium peroxymonosulfate) to form dimethyldioxirane (DMD).

A simplified method of producing dimethyldioxirane (DMD) was presented by Adam, W.; Bialas, J.; Hadjiarapoglou, L. *Chem. Ber.* 1991, 124, 2377. This process required rigorously controlled temperature <15° C., sodium hydrogen carbonate, potassium peroxymonosulfate, and rigorous stirring produces a 0.09-0.1 M acetone solution of dimethyldioxirane.

Ferrer, M.; Gibert, M.; Sanchez-Baeza, F.; Messeguer, A. *Tetrahedron Lett.* 1996, 37, 3585. disclosed a method resulting in yet higher yields (0.4 M) dimethyldioxirane solution have been developed requiring chlorinate solvents such as $CHCl_3$ or $CCl_4$. Use of such solvent is limited to laboratory applications.

Mello, R.; Fiorentino, M.; Sciacovelli, O.; Curci, R. *J. Org. Chem.* 1988, 53, 3890. Mello, reported a method of producing methyl(trifluoromethyl)dioxirane from 1,1,1,trifluoropropanone.

However, although dioxiranes have numerous potential applications, their use has been limited in utility because of the high cost associated with their production. Thus, dioxiranes have been used mainly in organic synthesis and applications where a high expense associated with poor yields and/or laborious reaction conditions can be justified.

One way to expand the application of dioxiranes is to replace exotic and expensive carbonyl donors with readily available (e.g., commercially produced) carbonyl sources. Dioxirane application can be further expanded by expediting the in-situ generation of dioxiranes to provide effective dioxirane yields within minutes from the initiation of the reaction. An expedited time period would be, e.g., within 30 minutes, and more preferably within 5 minutes. It is also desirable to induce the reaction under a wide range of operational conditions such as pH, concentration of reactants, and temperature.

Unfortunately, most of the commercially available ketones and aldehydes that can be cost-effectively purchased and applied are slow-reacting, and as a result require hours of reaction time to produce desirable yields. Table 1 below compares the rate of peroxymonosulfate decomposition for various ketones:

TABLE 1

Relative Rate of Peroxymonosulfate Decomposition

| Ketone | Relative Rate |
| --- | --- |
| None | 1 |
| Acetone | 10 |
| Cyclohexanone | 94 |
| Oxopiperidinium | 14,000 |

U.S. Pat. No. 5,785,887 discloses the use of a peroxygen ketalcycloalkanedione bleachant activator.

WO09923294A1 discloses a 2-step process whereby the second step includes producing an acidic dioxirane solution from potassium peroxymonosulfate and preferably oxopiperidinium salts.

U.S. Application 2005/0085402 discloses a solution containing dioxirane for purposes of decontamination.

U.S. Applications 2005/0192195, 2005/018726, 2004/0048763, and 2004/0038843, disclose a catalytic system and methods of oxidizing materials using the invention containing a metal catalyst complexed with selected macropolycyclic rigid ligands. This invention can be used with many conventional bleaching agents and bleach activators such as peroxycarboxylic acids to enhance oxidation of materials.

SUMMARY OF THE INVENTION

In one aspect, the invention is a composition for catalyst-mediated in-situ generation of dioxirane and an oxidizing solution containing dioxirane. The composition includes effective amounts of a transition metal catalyst, an alkali metal peroxygen compound, and at least one carbonyl donor compound. The composition produces the oxidizing solution containing dioxirane when admixed with water.

In another aspect, the invention is a method of bleaching laundries. The method entails admixing the above composition with water to produce the oxidizing solution, contacting the laundry articles with the oxidizing solution for an effective period of time, and rinsing the laundry article with water. The invention also includes a method of cleaning a carpet, a denture, and a hard surface.

In yet another aspect, the invention is a composition for a catalyst-mediated in-situ generation of a bleaching solution. The composition contains effective amounts of transition metal catalyst, an alkali metal peroxymonosulfate compound, and succinic anhydride donor, and produces a bleaching solution when admixed with water.

DETAILED DESCRIPTION OF THE EMBODIMENT(S)

It has been discovered that certain transition metals can function as catalyst to mediate the generation of dioxiranes at an increased rate. These dioxiranes, once produced, can be applied to various applications such as laundry bleaching, disinfections, oxidizer for decontamination, denture cleaning, hard surface stain removal and the like.

The invention allows high concentrations of dioxiranes to be produced at the point of use from low-cost carbonyl donors that are commercially and readily available. The invention also expedites the production of high concentrations of dioxirane to make its utility widely acceptable. An expedited period of time is to be considered measurable in minutes, preferably within 30 minutes and more preferably within 5 minutes. As a result of the combined benefits of high yield, high generation rates, and low-cost reagents, the invention dramatically improves the economic merits of dioxirane application.

The invention also allows the composition to be formulated and applied to effectively eliminate the problems resulting from undesired radical formation and damage. Examples of this include laundry damage from free radicals produced during catalytic decomposition of bleaching additives as described in U.S. patent application Publications 2005/0192195, 2005/018726, 2004/0048763, 2004/0038843. The invention allows the rate of reaction and the resulting solution composition to be effectively controlled so that the potential for production and release of free radicals is reduced. This is true during and after the dioxirane generating process.

For example, it has been demonstrated that increased concentrations of catalyst increase the rate of decomposition of the MPS and subsequent reactions. It has also been demonstrated that by increasing the concentration of carbonyl donor, $O_2$ evolution resulting from radical production can be significantly reduced, or for all practical purposes, eliminated. It is therefore reasonable to theorize that the solution resulting from use of the disclosed composition can be tailored to maximize consumption of the primary oxidizer (peroxysulfate) and the radicals it produces, maximize generation of the dioxirane, and minimize release of free radicals in the resulting bleach solution. This results in greater dioxirane bleaching efficacy, and minimized potential of free radical damage to materials such as dyes, fabric, and the like.

Further still, the ability to expedite the generation of dioxirane over a broad pH range is highly desirable. Highly concentrated solutions of MPS used for proof of practice testing were conducted at pH values $\leq 2.0$ far below the near neutral pH reported for un-catalyzed MPS generation of dioxirane which requires either sodium hydrogen carbonate of phosphate buffers to maintain pH within a rigid range of between 6.0-7.5, more typically reported between 6.5-7.5.

A. Composition

The composition of the invention contains an effective amount of alkali metal peroxygen compound, an effective amount of carbonyl donor compound, and an effective amount of a transition metal catalyst. An "effective amount" is intended to include ratios and concentrations that induce dioxirane generation at a rate and concentration which provides the desired effect by dioxirane oxidation.

1. Peroxygen Donor Compound

The principle bleaching agents utilized in the instant process and composition are inorganic peroxygen salts, organic peroxygen acids, and their water soluble salts. Examples of inorganic peroxygen salts include the water soluble monopersulfates and water soluble monoperoxyphosphates. Specific examples of such salts include sodium peroxymonosulfate, potassium peroxymonosulfate, disodium peroxymonophosphate and dipotassium peroxymonophosphate. Sodium and potassium peroxymonosulfates are preferred, and potassium peroxymonosulfate more preferred. Peroxymonosulfate is sold under the trade names Oxone® and Caroat®.

2. Carbonyl Donor Compounds

Carbonyl donors (C=O) can be selected from, but are not limited to, an extensive list of aldehydes and ketones reported in references such as U.S. Applications 2006/0013751 and 2006/0013750, and WO09923294A1.

The carbonyl donors selected will contribute at least one carbonyl group (C=O) and range from 1 to 30 carbons in its structure. The compound can be any effective configuration, whereby "effective configuration" implies that the carbonyl group is accessible for conversion to a dioxirane when dissolved in an aqueous solution.

The carbonyl donor can be selected from, but is not limited to, an aldehyde or ketone. As used herein, "aldehyde" is intended to include any compound that contains at least one carbonyl group and has two hydrogen atoms or carbon and a hydrogen atom attached directly to at least one of the carbonyl carbon atoms. As used herein, "ketone" is intended to include any compound that contains at least one carbonyl group and has two carbon atoms attached directly to at least one of the carbonyl carbon atoms.

Aldehydes can be employed and include but are not limited to: formaldehyde, acetaldehyde, butyraldehyde, benzaldehyde, 4-trimethylammonio benzaldehyde methyl sulfate.

Aliphatic ketones include but are not limited to: dihydroxyacetone, acetacetone, 2,3-hexanedione, trimethylammonio acetone nitrate, 5-diethylbenzylammonio 2-pentanone nitrate, 5-diethylmethylammonio 2-pentanone nitrate, methyl pyruvate, diethyl keto malonate, diethyl ketone, hydroxyacetone, hexachloracetone, 2,5-hexanedione, phenylacetone, ethyl levulinate, 3-hydroxy-2-pentanone, acetone, 3-penten-2-one, methyl ethyl ketone, 4-hydroxyl-3-methyl-2-butanone, 3-pentanone, 2-heptanone.

Aromatic ketones include but are not limited to: acetophenone, hydroxyquinoline, 4-acetyl-1-methylpyridium nitrate, di-2-pyriyl ketone N-oxide, 2-acetylquinoxaline, 2-acetyl-3-methylquinoxaline, di-2-pyridyl ketone, 6-acetyl-1,2,4-trimethyl quinolinium nitrate, 8-hydroxyquinoline N-oxide, methyl phenyl glyoxalate, N-methyl-p-morpholinio acetophenone methyl sulfate, 3-acetyl pyridine N-oxide, p-nitroacetophenone, m-nitroacetophenone, sodium p-acetyl benzene sulfonate, p-acetylbenzonitrile, 3,5-dinitroacetophenone, 4-trimethylammonioacetophenone nitrate, 4-methoxy-3-nitroacetophenone, p-chloroacetophenone, p-diacetylbenzene, N-methyl-p-morpholinio acetophenone, phenacyltriphenylphosphonium nitrate, 20acetyl pyridine, 2-acetylpyridine N-oxide, 3-acetyl pyridine, 4-acetyl pyridine, 4-acetyl pyridine N-oxide, 2,6-diacetyl pyridine, 3-acetyl pyridine N-oxide, triacetylbenzene.

Cyclic ketones include but are not limited to: cyclohexanone, 2-methylcyclohexanone, 2,6-dimethyl cyclohexanone, 3-methyl cyclohexanone, 4-ethyl cyclohexanone, 4-t-butyl cyclohexanone, 4,4-dimethyl cyclohexanone, methyl 4-oxo-cyclohexanone carboxylate, sodium 4-oxo-cyclohexanone carboxylate, 2-trimethylammoniocyclohexanone nitrate, 4-trimethylammonio cyclohexanone, nitrate, 3 oxo-cyclohexyl acetic acid, cycloheptanone, 1,4-cyclohexadione, dehydrochloric acid, tropinone methonitrate, N-methyl-3-oxoquinuclidium nitrate, cyclooctanone, cyclopentanone.

Heterocyclic ketones include but are not limited to: 2,2,6, 6-tetramethyl-4-piperidone hydrate, 1-methyl-4-piperidone N-oxide, N-carbethoxy 4-piperidone, tetrahydrothiopyran-4-one methonitrate, tetrahydrothiopyran-4-one S,S-dioxide, tetrahydrothiopyran-3-one,S,S,-dioxide, 4-oxacyclohexanone.

Also, ketones that possess a positive charge such as oxopiperidinium salts are also suitable.

Carbonyl donors can be released in-situ to the application such as in the case of trioxane or dioxane, whereby under acid conditions, they de-polymerize to form formaldehyde. Paraformaldehyde is another example of an activated carbonyl donor.

Studies suggest certain carbonyl donors have the ability to contribute to dioxirane formation and provide ligand-catalyst forming characteristics. Examples include but are not limited to N-succinimide and succinic anhydride.

Where succinic anhydride donor is used in place of the carbonyl donor, the suitable group of succinic anhydride donor that may be used include succinic anhydride, alkyl succinic anhydride, and alkenyl succinic anhydride. A surface-acting agent, e.g., Tergitol® and Dowfax sold by Dow Chemical Company, may be added to the composition to enhance the dissolution rate of the succinic anhydride donor in water. Such surface-acting agents may also be used to enhance dissolution of low-solubility carbonyl donors and/or to enhance penetration of organic based stains when the oxidizer solution is applied.

3. Catalyst

The metal catalyst will be a transition metal selected from metal salts, oxides, or ligand complexes containing one or more of Co, Ni, Ag, Mo, Mn, Fe, Cr, Pd, and Ti. The catalyst, regardless of its source, is a donor of the metal ion.

When the composition is used in applications where pH or competing ions can induce precipitation or inactivation of the metal ion, a chelating agent can be included in the composition to form ligands which complex with the metal ion, thereby maintaining its functionality as a catalyst. Examples include but are not limited to succinic acid, NaEDTA, NaNTA, citric acid and the like. Many cyclic ligands have been reported for complexing manganese. Examples are included in U.S. Application 2005/0192195.

The ligand selected can be based on effectiveness as well as economics and environmental factors. The use of a ligand-complexing agent or the type of ligand-complexing agent utilized, if any, it is not intended to limit the scope of the invention. Ligand chemistry can, however, expand the operating parameter in which the expedited in-situ generation of dioxirane takes place (i.e. elevated pH etc.).

B. Tests and Results

Monopersulfate (MPS) stock solution was comprised of distilled water and MPS to provide approximately a 15 wt. % MPS solution. The solution was produced in a Pyrex beaker and mixed using a magnetic stirrer and stir rod until a clear solution was produced.

MPS-catalyst stock solution was prepared by treating the MPS stock solution with 1000 ppm of Cobalt Chloride ($CoCl_2$) and mixing until a clear solution having a pink color was produced.

A 250-ml Erlenmeyer flask was used along with a magnetic stirrer and stirring rod for conducting catalyst efficacy test and qualitative dioxirane formation test.

Six tests and their results will now be presented.

1. Test 1

The effectiveness of the catalyst to induce decomposition of the MPS was determined by qualitatively monitoring the evolution of oxygen $O_2$ after admixing and completely dissolving the MPS and catalyst in distilled water to produce a 15 wt. % MPS-catalyst solution. Catalyst levels ranged from 1000 ppm to 5000 ppm while pH was $\leq 2.0$.

In the case where cobalt chloride was used as the catalyst, a continuous evolution of $O_2$ gas occurred as a result of continuous catalytic decomposition of the MPS. Higher concentrations of catalyst induced an increased rate of $O_2$ gas evolution.

In contrast, where copper sulfate was used as the catalyst, evolution of $O_2$ ceased shortly after the dissolution of the solids was completed indicating that catalytic decomposition of the $KHSO_5$ had stopped. Higher concentration of copper sulfate did not change the result. Also, vigorous mixing did little to induce $O_2$ evolution of the copper sulfate MPS solution beyond that observed without catalyst.

2. Test 2

To a MPS-catalyst stock solution comprising 1000 ppm of $CoCl_2$ and 15 wt. % MPS with a pH$\leq 2.0$, 0.2 grams of Saccharic acid ($C_6H_{10}O_8$) was added and mixed until dissolved. At rest, the resulting solution continued to experience wide-spread evolution of gas. Upon vigorous mixing, violent effervescent release of $CO_2$ gas occurred. Visually, vapor could be seen flowing over the lip of the Erlenmeyer flask, releasing an acrid $CO_2$ odor.

Table 2 illustrates the results of several tested transition metal donors to determine the catalytic effect of several potential catalyst reported effective for various types of radical generation. In all tests, equivalent weights of catalyst and wt. % of MPS were used.

TABLE 2

Effervesence of Various Transition Metal Donors

| Catalyst | Formula | Initial Effervescent Effect | Sequential Effervescent Effect |
|---|---|---|---|
| None |  | None | None |
| Copper Sulfate | $CuSO_4$ | None | None |
| Silver Citrate | $C_6H_5Ag_3O_7$ | Moderate | None |
| Silver Nitrate | $AgNO_3$ | High | None |
| Cobalt Chloride | $CoCl_2$ | Explosive | Very High |

Test 1 and Test 2 illustrate that many transition metals commonly used to induce free radical formation of peroxygen compounds are not effective for the catalytic decomposition of MPS. While only preliminary in nature and as not intended to limit the types of transition metals in the application, it appears transition metals having at least two reported oxidation numbers of $\geq +2$ effectively function as catalyst, while transition metals having oxidation numbers of $\leq +2$ show reduced efficacy.

Results of Test 2 illustrate that when saccharic acid is added to a cobalt catalyzed solution of MPS, rapid oxidation of the carbon results in formation and evolution of carbon dioxide ($CO_2$). During the rapid oxidation and evolution of $CO_2$, the catalytic decomposition of the MPS continues. Upon vigorous mixing of the solution, $CO_2$ is rapidly released, causing the solution to froth and climb the flask walls. This effect continues with periodic vigorous mixing as the result of continued formation and buildup of $CO_2$.

3. Test 3

To the stock MPS-catalyst solution, 0.2 grams of dihydroxyacetone was added and mixed until dissolved. The resulting solution experienced a noticeable period of suppressed $O_2$ gas evolution. After several minutes, the rate of gas evolution gradually increased until what appeared to be pre-addition levels of gas evolution resumed. Upon vigorous mixing, an increase in gas evolution occurred like that experienced with MPS-catalyst stock solutions. Vigorous mixing did not produce the violent effervescent release of gas like that experienced in the saccharic acid sample.

An additional 0.9 grams of dihydroxyacetone was added to the sample and mixed. After mixing, gas evolution from the sample appeared to completely cease. Again after several minutes, a noticeable increase in gas evolution reappeared. Upon vigorous mixing, gas evolution was minimal and appeared to be the result of $O_2$ evolution resulting from catalytic decomposition of MPS and not characteristic of effervescing $CO_2$ release.

A solution of distilled water and potassium iodide was used to qualitatively determine oxidant activity of the final dihydroxyacetone treated sample. Drops of solution into the vial of potassium iodide solution produced a dark iodine solution indicating a high concentration of oxidizer in the solution.

Test 3 demonstrates that when a simple ketone donor is added to the MPS-catalyst solution, the rate of oxygen evolution is decreased in relation to the concentration of ketone added. When sufficient ketone is added, the evolution of oxygen gas bubbles ceases.

Further still, after just a few minutes of lapsed time, oxygen evolution began to reappear until it achieved an evolution rate like that prior to the ketone addition. With vigorous mixing, little resemblance to the saccharic acid samples was observed. The liberation of gas was like that experienced from vigorously mixing a sample of MPS-catalyst stock solution.

The observations support the proposed theory that the addition of a carbonyl group (which in this example is a ketone donor) to the MPS-cobalt catalyst solution results in the adsorption of the ketone and MPS at the catalyst surface. Decomposition of the MPS and subsequent oxygen transfer to the carbonyl group results in the formation of dioxirane and desorption of the dioxirane, followed by a repeating cycle.

During this process, radical oxygen is consumed at a rate proportional to the concentration of ketone present. At lower concentrations of ketone, evolution of oxygen gas is diminished but still evident. Higher concentrations of ketone cease evolution of visible gas from the solution all together for at least a short period of time. These observations support the proposed theory. As the ketone donor concentration is reduced due to the increased concentration of dioxirane, the oxygen transfer and subsequent formation of dioxirane is reduced, and evolution of oxygen gas gradually resumes and increases.

Furthermore, the lack of $CO_2$ suggests the radical oxygen is not involved with decomposition of the ketone as is the case with saccharic acid systems. Therefore, the oxygen radicals are consumed by the carbonyl group on the carbon based ketone to form dioxirane rather than by carbon thereby forming $CO_2$.

4. Test 4

Five grams of dihydroxyacetone (DHA) was admixed with 15 grams of MPS, then added to 85 grams of water containing 1000 ppm of cobalt chloride. After addition, the sample was vigorously mixed for 3 minutes using a magnetic stirrer, then allowed approximately 1 minute to rest.

Observation of the resulting solution indicated no consistent evolution of $O_2$ gas. The solution remained pink in color. After 60 minutes of rest, the sample remained consistent in appearance and did not effervesce with periodic vigorous mixing.

A 25-ml sample was placed in a graduated cylinder. When granules of potassium iodide were added, iodine was immediately produced indicating the presence of oxidant.

In Test 4, sufficient DHA was added to provide >1:1 equivalence of carbonyl donor (C=O) to MPS ($KHSO_5^-$). Also, both reagents were added to the solution at the same time to minimize the potential of excess oxidant becoming available as the carbonyl donor is released.

As a result, rapid consumption of the oxygen radicals was observed evident by the complete suppression of $O_2$ evolution. Also, as a result of providing an excess of carbonyl donor and/or adding the reactants together, the potential for creating conditions of excess MPS, which in turn induce decomposition of the DHA and formation of $CO_2$, is eliminated. This is evident by the elimination of effervescent release when the sample is allowed to rest, followed by vigorous mixing.

The excess of carbonyl donors induces rapid consumption of oxygen radicals by the reactive carbonyl group as the radicals are produced. These results illustrate that creating such conditions induces rapid formation of the desired dioxirane, reduces the potential for decomposition of the carbon based reactant from excess oxidant, and reduces the potential for release of free radicals which can damage materials such as dyes and fabric.

5. Test 5

This test is a study of ligand effect and $O_2$ suppression. Various compounds were compared that indicated both ligand-complexing characteristics and the ability to consume oxygen, thereby suppressing oxygen evolution.

To each sample of solution comprising 85 grams of water containing 1000 ppm of cobalt chloride and 15 grams of MPS, 2-grams of additive were added and mixed for 10 minutes, then allowed to rest for approximately 5 minutes.

Solutions comprising 85 grams of water containing 1000 ppm of cobalt chloride and 15 grams of MPS were obtained, and 2 grams of each reagent were added and mixed for 10 minutes. The resulting solution was observed. As illustrated in Table 3, carbonyl donors such as succinic anhydride stabilized the $O_2$ evolution and possessed a ligand-complexing effect on the catalyst. While the sister reagent succinic acid had the same ligand effect, it did not possess the same suppressing effect on $O_2$ evolution, indicating no dioxirane formation. Succinimide, at the concentrations used, did not appear to possess the ligand-complex forming capabilities. Also, while some initial suppression of $O_2$ evolution was observed, it was not sustained. Lastly, the DHA had no ligand forming effect but suppressed $O_2$ evolution.

TABLE 3

Effect of Various Additives on Ligand Formation and $O_2$ Evolution

| Additive | Color reduction | $O_2$ evolution | Effervesces w/mixing |
|---|---|---|---|
| None | No - pink color | yes-consistent | yes |
| Succinic acid | yes | yes-consistent | yes |
| Succinic anhydride | yes | no | no |
| N-Succinimide | No - pink color | temporarily diminished | yes |
| Dihydroxyacetone | No - pink color | suppressed | minimal |

The results indicate that much benefit can be derived from proper selection and combination of carbonyl donors for use in this invention. It is apparent that some carbonyl donors can provide a synergistic effect by inducing a catalyst stabilizing ligand-complex while also providing at least some benefit from dioxirane formation.

6. Test 6

Test was conducted at an elevated pH by producing 110 ml of water containing 90 ppm as $CoCl_2$, 3 grams of MPS, 3 grams $K_2CO_3$, and 1 gram of the designated carbonyl donor. The dry powders were mixed, then added to the water-cobalt solution while being vigorously mixed. The appearance of the resulting solution was noted after 2 minutes of mixing followed approximately 1 minute of rest. Potassium iodide (KI) test was carried out by acidifying a sample of solution with dilute HCL until the pH was below 4.0.

Catalyzed reactions at elevated pH indicated the aliphatic dihydroxyacetone experienced rapid decomposition to form carbon dioxide resulting in suppression of the solution pH and elimination of potassium iodide activity. Dihydro-2,5-furandione (succinic anhydride) having greater resistance to oxidation had similar effect on $O_2$ suppression and retention of KI activity as it displayed under acid conditions. Again, when added to provide at least a 1:1 equivalence ratio of carbonyl donor to $KHSO_5^-$, the $O_2$ evolution was completely suppressed and the solution remained stable.

Reaction characteristics with different catalysts are summarized in Table 4.

TABLE 4

Oxygen Evolution and KI Activity of Solutions with Various Catalysts

| Catalyst | Soln Appearance | $O_2$ Evolution | soln pH | KI Activity |
|---|---|---|---|---|
| none | Green-clear | continuous | 10.2 | high |
| Dihydroxyacetone | Green-clear | none | 9.6 | none |
| Succinic Anhydride | Green-slight turbidity | none | 10.1 | high |
| N-Succinimide | Green-clear | continuous | 10.2 | high |

The color of the solution was olive green, and even at elevated pH, possessed catalytic activity. It is theorized that the catalyst activity at the elevated pH and color was the result of formation of Co—O—O—Co which is believed to be 2 Co(III) atoms joined by a superoxide ($O_2^-$) bridge.

C. Methods of Application

The dioxirane produced in accordance with the invention is useful for preparing an oxidizing solution. The composition can be a dry product that is admixed and added to water to form an oxidizing solution. In the alternative, the composition may be comprised of one or more liquids, or be comprised of any combination of the above.

Regardless of the nature of the components comprising the composition, the resulting oxidizing solution can be used as part of the wash-water for laundries, applied directly to a material such as laundry, applied to carpeting to remove a stain, or applied to a hard surface for cleaning. For example, the composition can be used for denture cleaning, bathroom surface cleaning, disinfecting surfaces, oxidation of chemicals and the like.

In laundry applications, the composition can be applied to the wash water as the machine is filling, added to the water prior to or during a soak cycle, admixed with water then added to the bleach dispenser, admixed with water to produce an oxidizing solution, then applied directly to stains prior to washing, and the like.

It is also conceivable to combine the composition with surfactants, brighteners, builders and the like to produce a detergent-bleaching composition. The disclosed composition can be combined with the detergent additives by admixing the powders or granules of the composition into a mixer/densifier using high, moderate or low shear. Machines such as those sold under the trade names "LÖdige CB30" or "LÖdige CB30 Recycler," or a granulator such as those sold under the trade names "Shugi Granulator" and "Drais K-TTP 80" may be suitable.

Further still, it would be advantageous to add granules of the composition to the granulator, followed by the detergent additives. In this way, the granules of the composition will be effectively coated by the detergent additive. Further still, after addition of the granules of the composition and prior to addition of the detergent additives, intermittent addition of gel-forming additive as disclosed can be added to pre-coat the granules with the gel-forming powder.

For stain removal of laundries, carpeting, dentures, and hard-surfaces such as counter tops, bathroom surfaces, and disinfecting surfaces, the composition can be admixed with water and applied using any convenient means of application such as a rag, towel, spray dispenser, foam applicator, brush, sponge. These means of application are not intended to be limiting, and any suitable and convenient method of application may be used. An effective period of contact time is dependent on the concentration of the oxidizing solution, the nature of the stain, the type of surface, and the like. Regardless, an "effective period of time" is the amount of time required to achieve the desired effect or the maximum achievable effect from the oxidizing solution. In a practical sense, an effective period of time is considered to range from about 3 seconds to 24 hours. In cases where the object is in direct contact with a concentrated oxidizing solution, the effective period of time will be closer to three seconds. However, in a situation where the solution is diluted, such as in the case of laundry pre-soak, the effective period of time may be closer to 24 hours.

It is understood that the oxidizing solution as well as the starting composition can be formulated to include conventional oxidizers and free radical forming reagents. For example, addition of reagents for formation of peracids such as TAED with percarbonate, or formation of percarboxylic acids with a catalyst, are within the scope of the invention.

D. Methods of Production

1. Powder

Powder formulations can be produced by selecting dry ingredients such as: potassium peroxymonosulfate, dihydroxyacetone, and cobalt chloride. While used as an example, this combination is not selected to limit the invention or various combinations. After the appropriate weight ratios for the application are selected, they are mixed and packaged for storage, distribution, and final application.

Another option would be to provide the reagents to the point of use and admix them at the point of use. In the alternative, the reagents may simply be added independently to form an aqueous solution. The order of addition is not considered limiting to the benefits offered by the invention.

2. Agglomerate

The powdered composition can be formed into an agglomerate by feeding the mixture to an agglomerating equipment. Once fed to the agglomerating equipment, a pressure of about 1,000 to about 10,000 psig is applied. Residual moisture or a binder as disclosed can be added to enhance the agglomeration process. The pressure makes the binder-powder mixture agglomerate. The exact pressure to be applied is determined based on the final composition, the desired density of the resulting agglomerate, the desired dissolution rates, and the like. If desired, the agglomerate may be ground or crushed to achieve the desired particle size.

The agglomerate of reactants (with or without binders) is granulated or crushed to form small pieces, or granules, containing the reactant mixture.

Examples of equipment suitable for producing the agglomerate composition in the above methods include a compactor, an agglomerator, a roll compaction, a briquetting/tableting tool, an extruder, and the like. These suitable equipment is obtainable from Hosokawa Micron Corporation.

3. Binder

A binder can be as little as moisture from a hydrate but may also include addition of materials such as an absorbent polyacrylic polymers and copolymers such as Carbopol®. The binder may also be a poloxamer block copolymer such as Poloxamer 407 sold by BASF under the trade name Lutrol® F 127, polyvinyl alcohol, polyacrylamides, a water soluble wax such as Luwax®, alkali metal salts of stearate, silicates and the like. Any additive that enhances the binding ability of the powder to hold the integrity of the granules when they are formed can be utilized if desired.

4. Gel Suspension

Gel suspensions of the invention possess thixotropic properties in a non-aqueous condition.

A polymer, such as one of the Carbopol® Polymers, is combined with the alcoholic solvent to create an alcoholic gel. A Carbopol® polymer, which is combined with the alcohol to increase the viscosity of the alcohol, is a high molecular weight polymer of acrylic acid crosslinked with a polyalkenyl polyether. A Carbopol® polymer may be used to develop products with a wide range of flow and rheological properties. MPS and any other additives comprising the composition, or granules of the composition, are mixed into the alcoholic gel to be suspended in the gel. The composition of the invention is added to the gel making up from 5 wt. % to about 80 wt. % of the total gel-composition mix. Encapsulated by the alcoholic gel, the MPS and the additives are made stable enough for storage over 10° F. to 110° F.

The alcoholic gel shields the components from moisture in the environment during storage. However, when the alcoholic gel is placed in contact with a bulk quantity of water, the gel is diluted to a less viscous form and the components are allowed to dissolve in the bulk water. The reactions take place, and the dioxirane oxidizing solution that forms is ready for use.

Thickening agents, which can be used to ensure the physical stability of the suspension and enhance viscosity, may swell and develop thixotropic properties in a nonaqueous environment. Thickening agents include organic polymeric materials and inorganic and organic modified clays. Essentially, any clay can be used as long as it will swell in a nonaqueous medium and develop thixotropic properties. A preferred clay is bentonite. A swelling agent is used with the bentonite clay. The preferred swelling agent is a combination of propylene carbonate and tripropylene glycol methyl ether. However, any other substance that will cause bentonite to swell in a nonaqueous environment and thus develop thixotropic properties can be used.

The nonaqueous liquid carrier materials that can be used for the nonaqueous liquid compositions include the higher glycols, polyglycols, polyoxides and glycol ethers.

Suitable substances are propylene glycol, polyethylene glycol, polypropylene glycol, diethylene glycol monethyl ether, diethylene glycol monopropyl ether, diethylene glycol monobutyl ether, tripropylene glycol methyl ether, propylene glycol methyl ether (PM), dipropylene glycol methyl ether (DPM), propylene glycol methyl ether acetate (PMA), dipropylene glycol methyl ether acetate (DPMA), ethylene glycol n-butyl ether and ethylene glycol n-propyl ether and mixtures thereof. A preferred nonaqueous carrier of the instant invention is polyethylene glycol 200 (PEG200) or polyethylene glycol 300 (PEG300).

Other useful solvents are ethylene oxide/propylene oxide, liquid random copolymer such as Synalox solvent series from Dow Chemical (e.g. Synalox 50-50B). Other suitable solvents are propylene glycol ethers such as PnB, DPnB and TPNB (propylene glycol mono n-butyl ether, dipropylene glycol and tripropylene glycol mono-n-butyl ethers) sold by Dow Chemical under the tradename Dowanol. Also tripropylene glycol mono methyl ether "TPM Dowanol" from Dow Chemical is suitable. Another useful series of solvents are supplied by CCA biochem of Holland such as Plurasolv®L, Plurasolv®LS(s), Plurasolv®EL, Plurasolv®IPL and Plurasolv®BI.

Mixtures of PEG solvent with Synalox or PnB, DPnB, TPnB and TPM solvents are also useful. Preferred mixtures are PEG 300/Synalox 50-50B and PEG 300/TPnB in weight ratios of about 95:5 to 20:80, more preferably of about 90:10 to 50:50. EP/PO capped nonionic surfactants can be used as a liquid solvent carrier and an example of such a nonionic surfactant is Plurafac LF/132 sold by BASF.

The system used in the instant compositions to ensure phase stability (stabilizing system) can comprise a finely divided silica such as Cab-O-Sil M5, Cab-O-Sil M5, Cab-O-Sil EH5, Cab-O-Sil TS720 or Aerosil 200 which are used as a concentration level of about 0 to about 4.0 weight percent, more preferably about 0.5 to about 3.0 weight %. Also employed as a stabilizing system are mixtures of finely divided silica such as Cab-O-Sil and nonionic associative thickeners such as Dapral T210, T212 (Akzo) which are low molecular weight dialkyl polyglycol ethers with a dumbbell-like structure or pluracol TH 916 and Th 922 (BASF) associative thickeners having star-like structure with a hydrophilic core and hydrophobic tail. These thickeners are used at concentration levels of about 0 to about 5.0 weight percent together with about 0 to about 2.0 weight percent of finely divided silica. Another useful stabilizing systems are blends of organoclay gel and hydroxypropyl cellulose polymer (HPC). A suitable organoclay is Bentone NL27 sold by NL Chemical. A suitable cellulose polymer is Klucel M cellulose having a molecular weight of about 1,000,000 and is sold by Aqualon Company. Bentone gel contains 9 percent Bentone NL 27 powder (100 percent active), 88 percent TPM solvent (tripropylene glycol mono methyl ether) and 3 percent propylene carbonate (polar additive). The organic modified clay thickener gels are used at concentration levels of about 0.0 weight percent to about 15 weight percent in conjunction with Klucel M at concentration levels of about 0 to about 0.6 weight percent, more preferably about 0.2 weight percent to about 0.4 weight percent. Another useful thickening agent is a high molecular weight long chain alcohol such as Unilin™ 425 sold by Petrolite Corp.

5. Gel Coating

Granules which are produced as previously disclosed can be coated with an absorbent polyacrylic polymers and copolymers such as Carbopol®. A poloxamer block copolymer such as Poloxamer 407 sold by BASF under the trade name Lutrol® F127, polyvinyl alcohol with or without borax, or polyacrylamides may also be used.

When powder coating is applied, the powder or granules of the composition can be fed to a granulator, followed by a second step of adding the gel-forming additive. The composition and gel-forming additive can be fed into a mixer/densifier using high, moderate or low shear such as those sold under the trade names "LÖdige CB30" or "LÖdige CB30 Recycler," a granulator such as those sold under the trade names "Shugi Granulator" and "Drais K-TTP 80".

The coating can be applied either as a dry powder, or can be made adherent by applying a spray coating in a fluidized bed drier.

While the foregoing has been disclosed with reference to particular examples of the invention, it will be appreciated by those skilled in the art that adjustments may be made to these examples without departing from the principles and spirit of the invention.

What is claimed is:

1. A composition for catalyst-mediated in-situ generation of dioxirane and an oxidizing solution containing dioxirane with an oxidizing solution pH of less than about 6.0, the composition comprising: effective amounts of a transition metal catalyst; potassium peroxymonosulfate; and at least one dioxirane precursor comprising a carbonyl donor compound; wherein when the composition is admixed with water the transition metal catalyst catalyzes the decomposition of the potassium peroxymonosulfate forming a free radical, reaction of the free radical with the carbonyl donor, oxygen addition with the carbonyl donor, subsequent dioxirane formation, and wherein the composition comprises:

about 0.001-1 wt. % transition metal catalyst measured as elemental metal;
about 40-99 wt. % potassium peroxymonosulfate;
0.99-59.999 wt % carbonyl donor(s); and
totaling 100 wt %.

2. The composition of claim 1, wherein about 0.01-1.0 wt. % of the composition is the transition metal catalyst.

3. The composition of claim 1, wherein the oxidizing solution is ready for use in less than 30 minutes.

4. The composition of claim 1, wherein the oxidizing solution is ready for use in less than five minutes.

5. The composition of claim 1, wherein the oxidizing solution is ready for use in less than three minutes.

6. The composition of claim 1, wherein the oxidizing solution is ready for use in less than one minute.

7. The composition of claim 1, wherein the transition metal catalyst comprises a cobalt donor.

8. The composition of claim 1, wherein the transition metal catalyst comprises a manganese donor.

9. The composition of claim 1, wherein the transition metal catalyst comprises an iron donor.

10. The composition of claim 1, wherein the transition metal catalyst comprises a silver donor.

11. The composition of claim 1, wherein the transition metal catalyst comprises a molybdenum donor.

12. The composition of claim 1, wherein the transition metal catalyst comprises a nickel donor.

13. The composition of claim 1, wherein the transition metal catalyst is a chromium donor.

14. The composition of claim 1, wherein the transition metal catalyst is a platinum donor.

15. The composition of claim 1 further comprising a ligand donor that complexes with the transition metal catalyst.

16. The composition of claim 1, wherein the carbonyl donor has at least a carbonyl group (C=O) with 1 to 30 carbons in its structure and possesses a configuration that allows effective access of the transition metal catalyst to the carbonyl group when dissolved in an aqueous solution.

17. The composition of claim 1, wherein the composition is a powder.

18. The composition of claim 1, wherein the composition is an agglomerate.

19. A method of bleaching laundries, the method comprising:
admixing the composition of claim 1 with water to produce the oxidizing solution;
contacting the laundry articles with the oxidizing solution for an effective period of time; and
rinsing the laundry article with water.

20. The method of claim 19, wherein the contacting of the laundry article with oxidizing solution comprises adding the laundry article to the oxidizing solution.

21. The method of claim 19, wherein the contacting of the laundry article with the oxidizing solution comprises applying the oxidizing solution to the laundry article.

22. The method of claim 19, wherein the contacting of the laundry article with the oxidizing solution comprises applying the oxidizing solution to the laundry article in the form of a spray.

23. A method of cleaning a carpet comprising:
admixing the composition of claim 1 with water to produce the oxidizing solution;
contacting the carpet with the oxidizing solution for an effective period of time; and
rinsing the carpet with water.

24. The method of claim 23, wherein the contacting of the carpet with the oxidizing solution comprises applying the oxidizing solution to the carpet in the form of a spray.

25. The method of claim 23, wherein the contacting of the carpet and the oxidizing solution is made by applying the oxidizing solution to the carpet.

26. A method of cleaning a denture comprising:
admixing the composition of claim 1 with water to produce the oxidizing solution;
contacting the dentures with the oxidizing solution for an effective period of time; and
rinsing the denture with water.

27. A method of cleaning a hard surface comprising:
admixing the composition of claim 1 with water to produce the oxidizing solution;
contacting the hard surface with the oxidizing solution for an effective period of time; and
rinsing the hard surface with water.

28. The method of claim 27, wherein the contacting of the hard surface and the oxidizing solution comprises applying the oxidizing solution to the hard surface in the form of a spray.

29. The method of claim 27, wherein the contacting of the hard surface and the oxidizing solution comprises applying the oxidizing solution to the hard surface.

30. The method of claim 27, wherein the hard surface is a counter top.

31. The method of claim 27, where the hard surface is a bathroom fixture.

32. The method of claim 27, wherein the hard surface is a bathroom surface.

33. The method of claim 27, wherein the cleaning includes disinfecting.

34. The method of claim 27, wherein the cleaning includes stain removal.

35. A composition for catalyst-mediated in-situ generation of dioxirane and an oxidizing solution containing dioxirane and potassium peroxymonosulfate, the composition comprising: effective amounts of a transition metal catalyst; potassium peroxymonosulfate; and at least one dioxirane precursor comprising a carbonyl donor compound; wherein when the composition is admixed with water the transition metal catalyst catalyzes the decomposition of the potassium peroxymonosulfate forming a free radical, reaction of the free radical with the carbonyl donor, oxygen addition with the carbonyl donor, subsequent dioxirane formation, and wherein the composition comprises:
about 0.001-1 wt. % transition metal catalyst measured as elemental metal;
about 90.1-99.9 wt. % potassium peroxymonosulfate;
0.99-9.999 wt % carbonyl donor(s); and
totaling 100 wt %.

36. A composition for catalyst-mediated in-situ generation of dioxirane and an oxidizing solution containing dioxirane with reduced potential of dye and fabric damage, the composition comprising: effective amounts of a transition metal catalyst; potassium peroxymonosulfate; and at least one dioxirane precursor comprising a carbonyl donor compound; wherein when the composition is admixed with water the transition metal catalyst catalyzes the decomposition of the potassium peroxymonosulfate forming a free radical, reaction of the free radical with the carbonyl donor, oxygen addition with the carbonyl donor, subsequent dioxirane formation, and wherein the composition comprises:
about 0.001-1 wt. % transition metal catalyst measured as elemental metal;
about 49.00-79.989 wt. % potassium peroxymonosulfate;
20.01-50.00 wt % carbonyl donor(s); and
totaling 100 wt %.

* * * * *